United States Patent [19]
Von Grünberg et al.

[11] Patent Number: 5,926,017
[45] Date of Patent: Jul. 20, 1999

[54] DEVICE FOR MEASURING THE ROTARY FREQUENCY OF A ROTATING VEHICLE WHEEL AND VEHICLE TIRE FOR USE IN THE DEVICE

[75] Inventors: Hubertus Von Grünberg; Thomas Becherer, both of Hanover; Heinrich Huinink, Garbsen; Klaus Kleinhoff, Rodenberg, all of Germany

[73] Assignee: Continental Aktiengesellschaft, Hanover, Germany

[21] Appl. No.: 08/882,563

[22] Filed: Jul. 3, 1997

[30] Foreign Application Priority Data

Jul. 4, 1996 [DE] Germany ............... 196 26 843

[51] Int. Cl.⁶ .................. G01P 3/48; G01P 3/54; G01P 3/36; G01B 7/14
[52] U.S. Cl. ............. 324/166; 324/173; 324/175; 324/207.22; 324/207.25
[58] Field of Search ............ 324/207.11, 207.22, 324/207.25, 173, 174, 175; 250/231.13, 231.14, 231.17, 231.18

[56] References Cited

FOREIGN PATENT DOCUMENTS

| 2341317 | 2/1975 | Germany . |
|---|---|---|
| 3942573 | 6/1991 | Germany . |
| 4435160 | 4/1996 | Germany . |
| 9005646 | 5/1990 | WIPO . |

*Primary Examiner*—Walter E. Snow
*Attorney, Agent, or Firm*—Robert W. Becker & Associates

[57] ABSTRACT

A device for measuring a rotary frequency of a rotating vehicle tire includes a number of first poles uniformly arranged on a circle with a radius R1 on or within a vehicle tire. A first sensor, for sensing the first poles, is stationarily arranged at a distance R2 from a rotational axis of the vehicle wheel. The radii have the following relationship: 0.9 R1<R2<1.1 R1. A computing unit is connected to the first sensor. The first sensor sends first signals to the computing unit when the first poles pass the first sensor. The computing unit determines a first time period between passing of sequential ones of the first poles. The computing unit multiplies a reciprocal value of the first time period by a reciprocal value of the number of the first poles to a multiplication product and supplies the multiplication product as a measure of a first rotary frequency to a user device.

20 Claims, 6 Drawing Sheets

DEVICE FOR MEASURING THE ROTARY FREQUENCY OF A ROTATING VEHICLE WHEEL AND VEHICLE TIRE FOR USE IN THE DEVICE

BACKGROUND OF THE INVENTION

The present invention relates to a device for measuring the rotary frequency of a rotating vehicle wheel in which along a circular line in the circumferential direction of the vehicle wheel poles are uniformly distributed. A sensor responsive to the poles is positioned at a distance to the axis of rotation of the vehicle wheel stationarily in the vicinity of the circular line so that the poles passing the sensor produce a sequence of signals. A computing or processing device is provided which determines the time period between passing of sequentially arranged poles on the circular line. The time periods measured and the number of poles provided at the vehicle wheel provide a means for determining the rotary frequency which is displayed on a display unit or used for slip control in an anti-lock brake system or traction system.

Such devices are well known and are applied in conjunction with wheel slip control systems especially for avoiding locking of wheels during braking.

A vehicle wheel in the context of this application includes the combination of all components which, aside from the load-depending deformations, are designed for rotation relative to the wheel suspension but are connected to one another so as not to rotate relative to one another. A wheel thus includes especially the tire, the wheel rim with rim flange and rim dish, the valve, the hub, possibly also sealing and/or securing rings mounted there at, brake discs, anti-lock system magnet wheels and optionally the drive shafts.

The goal of the invention is an increase of the safety level of motor vehicles on wheels with tires, especially pneumatic tires, which, at least in the longitudinal direction, transmit forces onto the road etc. only by frictional connection. Even though under most operating conditions the maximum possible frictional force transmission is never completely used, it is necessary to obtain great accelerations, especially with negative sign, i.e., great braking forces whenever it is necessary to react to unpredictable events, for example, when encountering out-of-control vehicles or a child running onto the street.

It is known that the level of greatest possible acceleration depends substantially on the frictional coefficient between the tire and the road surface. It is furthermore known that this frictional coefficient depends on the material pair road surface/tire, in general an asphalt/rubber mixture, the air pressure within the tire, the footprint length, the tread design as well as the weather conditions. Furthermore, it is known that the frictional coefficient is a function of slip. Slip is defined as the difference of tire circumferencial velocity minus velocity of the steering knuckle, divided by the velocity of the steering knuckle.

FIG. 1 shows for a conventional material pair under typical operating conditions the course of the frictional coefficient $\mu_{longitudinal}$ as a function of slip, in the following referred to as slip curve. The maximum longitudinal frictional coefficient is reached for a slip value of approximately 10%. When the slip is further increased, for example, during braking by increasing the braking moment, the frictional coefficient and thus the effective longitudinal force would no longer increase but instead would decrease. This not only would result in an immediate decrease of the braking forces but also, when maintaining the braking moment which is too great, to a fast decrease of the vehicle wheel rotary frequency and thus would cause the vehicle wheel circumferential velocity to fall to 0. This happens the quicker the smaller the moment of inertia of the wheel relative to the vehicle mass. The operational state in which the wheel no longer rotates despite the still present steering knuckle velocity is called locking. The slip then is −100%.

FIG. 2 shows in a solid line the slip curve for the same tire on cold ice (for warm ice it is even more unfavorable), and, as a comparison, in a thin dashed line the slip curve of FIG. 1 is also shown. The value $\mu_{max}$ is not only much lower but also occurs at a smaller slip value.

Even for a minimally excessive braking moment the rotary deceleration of the wheel surpasses the vehicle deceleration which will worsen the braking slip that initially is only minimally too large. From a starting value of, for example, −40%, it quickly decreases to −100%. Due to this effect of surpassing the slip correlated with the maximum frictional coefficient, the range outside of this slip is conventionally referred to as instable slip area. The slip area between 0 and this value is referred to as stable. The slip correlated with the maximum frictional coefficient is called critical slip.

The same holds true also for drive slip that is excessive. Slipping drive wheels have a negative effect on the vehicle safety, even though not to such a great extent as locking wheels during braking. Furthermore, in the conventional non-locking differentials, the drive force does not break down, as during braking, for each wheel but for each axle because the greater portion of the drive output is transmitted to the slipping wheel. For non-locking interaxle differentials the drive force would even break down almost completely.

In addition to the decrease of the transmittable longitudinal force, for braking under locking conditions as well as for slipping drive wheels, the vehicle safety in such operational states is impeded by the loss, in the case of locking brakes the complete loss, of the ability to transmit lateral forces. The straight running stability is thus only supported by the translatory inertia of masses and the moment of inertia about the vertical vehicle axis; steering maneuvers are impossible.

Because of the great importance of adjusting the correct slip for the requirement of greatest possible positive or negative acceleration and because of the fact that a person as a controller is usually only capable of simultaneously maintaining a maximum of two wheels within the optimal slip range, as is the case with a motorcycle, whereby for all other motor vehicles including airplanes, in general, only one actuating device for the entire number of wheel brakes is present, the development of slip control systems, i.e., of systems where a technical device takes over the control function performed by the human being, began in the 1940's initially only for the braking systems of airplane landing gear. When using such systems, a person by adjusting the lever pressure, lever travel or pedal pressure or pedal travel etc. only transmits his desire for controlling the nominal value, for example, the brake acceleration.

The control system, on the other hand, has been assigned the task to adjust for each wheel individually the favorable slip. Most of the slip control systems will only function when at one wheel almost the critical slip has been reached. By preventing a further increase of the brake, respectively, drive moment, locking or slipping is prevented. Once the critical slip has been surpassed, for example, when the wheel suddenly encounters a worse frictional pairing, as, for example, blue basalt etc. the control system reduces the brake, respectively, drive moment to such an extent and for such a period of time until the slip has been adjusted to just below the critical slip.

Slip control devices have been used for approximately nine years in the mass production of passenger cars, trucks, and trailers with increasing market share. Insofar as they control only the brake slip, the acronym ABS (derived from Anti Blocking System) has been used. Slip control systems prove their effectiveness especially impressively under such driving conditions where one wheel track runs on a surface with bad maximum coefficient of friction while the other wheel track runs on a surface with high maximum coefficient of friction.

Slip control systems of the prior art detect very precisely the actual rpm of each wheel. For this purpose, each wheel is provided with a so-called magnet wheel that on a circular line in the circumferencial direction comprises a plurality of marks, the passing of which is detected by a non-rotatingly arranged sensor based on magnetic flux fluctuations. From the time interval between passing of two adjacently arranged marks of the magnet wheel, the microcomputer of the control device calculates the wheel rpm (rotary frequency). For this purpose, the reciprocal value of the time period (time interval) is multiplied with the reciprocal value of the number of poles along the circular line. After multiplication of the thus determined rotary frequency with the stored circumferencial length of the vehicle wheel, the vehicle wheel circumferencial velocity is determined. Based on these data the computer, also referred to as an electronic control device, also detects the change of the wheel rpm or of the wheel circumferencial velocity over time.

From German Patent Application 44 35 160 it is known that the circumferencial force acting on the wheel causes a rotation of the belt and of the tread surface relative to the rim and the parts that are in torsion-shift connection thereto, especially the magnet wheel. In the entire torsional deformation chain from the tire tread surface, the belt, the tire sidewalls, the tire bead, the rim flange, the rim bed, the rim dish, the fastening screws, the wheel rim, to the magnetic wheel, the by far greatest torsional softness is located within the tire sidewall.

With the devices for measuring the rotary frequency of a rotating vehicle wheel known in the prior art, the rotary frequency can only be determined for the magnet wheel of the vehicle wheel. This rotary frequency coincides precisely, due to the torsionally stiff connection, with the rotary frequency of the brake drum or the brake disc of the wheel, especially during phases of acceleration changes, but does not coincide with the rotary frequency of the tire tread surface. However, this is the decisive factor in regard to slip on road surfaces. The inventors have recognized that the known ABS systems function much better when in addition to the rotary frequency of the brake drum, respectively brake disc the rotary frequency of the tire tread surface is also determined. This overcomes the prejudice in regard to the concept that only one single rotary frequency is present at the wheel. The inventors have recognized instead that substantially two rotary frequencies are present, i.e., the rotary frequency of the tire tread surface and of the belt ply array (in short, belt) underneath and the rotary frequency of the rim parts, wheel hub, sealing rings, brake disk or drum and the magnet wheel, on the other hand, i.e., parts in torsionally stiff connection relative to the wheel rim or the wheel rim itself and also the tire bead that is torsionally stiff relative to the wheel rim.

Thus, it is an object of the present invention to improve a device for measuring the rotary frequency of a rotating vehicle wheel in order to provide more useful data for slip control etc..

SUMMARY OF THE INVENTION

It is suggested with the present invention to provide a circular line in the circumferencial direction of a vehicle wheel in the vicinity of the belt with poles, preferably uniformly distributed, whereby the radius of the circular line is identified with R. The poles are also referred to as transducers or marks. A sensor, in a manner known per se, is positioned at a distance R to the axis of rotation of the vehicle wheel stationarily in the vicinity of the aforementioned circular line so that the poles which pass the sensor produce a sequence of signals within the sensor. The inventive device furthermore comprises a computing or processing unit which determines the time period between passing of sequentially arranged poles within the circular line and which multiplies the reciprocal value of the respective time period with the reciprocal value of the number of poles on the circular line and supplies the resulting multiplication product as a measure of the wheel rotary frequency to user devices, be it a display, slip control device or ABS system etc.

Such a device is especially suitable for use with tire slip control systems. Such a device is, of course, also suitable for supplying the measured values to the speedometer.

Thus, the device for measuring the rotary frequency of a rotating vehicle wheel according to the present invention is primarily characterized by:

a number of first poles uniformly arranged on a circle (circular line) with a radius $R1$ on or within a vehicle tire;

a first sensor, for sensing the first poles, stationarily arranged at a distance $R2$ from a rotational axis of the vehicle wheel, wherein $0.9\ R1 < R2 < 1.1\ R1$;

a computing unit connected to the first sensor; the first sensor sending first signals to the computing unit when the first poles pass the first sensor;

the computing unit determining a first time period between passing of sequential ones of the first poles;

the computing unit multiplying a reciprocal value of the first time period by a reciprocal value of the number of the first poles to a multiplication product and supplying the multiplication product as a measure of a first rotary frequency to a user device.

The vehicle tire has an outermost belt edge positioned at a radius $R3$ relative to the rotational axis RA of the vehicle wheel and wherein $0.9\ R3 < R1 < 1.1\ R3$.

In an axial direction of the vehicle tire, the first poles are positioned in the vicinity of the belt edge.

The first poles cause a change of magnetic flux and the first sensor responds to changes of magnetic flux.

Alternatively, the first poles cause a change of optical reflection and/or optical absorption wherein the first sensor responds to changes of optical reflection and/or optical absorption.

The device may further comprise a number of second poles at the vehicle wheel in non-torsional connection relative to the wheel rim, and a stationary second sensor for sensing the second poles. The second sensor sends second signals to the computing unit when the second poles pass the second sensor. The computing unit determines a second time period between sequential ones of the second poles, multiplies a reciprocal value of the second time period by a reciprocal value of the number of the second poles to a multiplication product for determining a second rotary frequency, and compares the first rotary frequency with the second rotary frequency.

Preferably, the second poles cause a change of magnetic flux and the second sensor responds to changes of magnetic flux. In the alternative, the second poles caus a change of optical reflection and/or optical absorption and the second sensor responds to changes of optical reflection and/or optical absorption.

Advantageously, the present invention also relates to a device for measuring the rotary frequency of a rotating vehicle wheel primarily characterized by:

a number of first poles non-uniformly arranged on a circle (circular line) with a radius R1 on or within a vehicle tire; a first sensor, for sensing the first poles, stationarily arranged at a distance R2 from a rotational axis of the vehicle wheel, wherein 0.9 R1<R2<1.1 R1;

a computing unit connected to the first sensor;

the first sensor sending first signals to the computing unit when the first poles pass the first sensor;

the computing unit determining a first time period between passing of sequential ones of the first poles;

the computing unit multiplying a reciprocal value of the first time period by a ratio of a memorized angular distance between adjacent ones of the first poles to the 360° circumferential angle of revolution of the vehicle wheel to a multiplication product and supplying the multiplication product as a measure of a first rotary frequency to a user device.

Advantageously, the vehicle tire has an outermost belt edge positioned at a radius R3 relative to the rotational axis of the vehicle wheel, and wherein 0.9 R3<R1<1.1 R3.

In the axial direction of the vehicle tire, the first poles are positioned in the vicinity of the belt edge.

The first poles cause a change of magnetic flux and the first sensor responds to changes of magnetic flux. The first poles may also cause a change of optical reflection and/or optical absorption and the first sensor may respond to the changes in optical reflection and/or optical absorption.

The device may further comprise a number of second poles at the vehicle wheel in non-torsional connection relative to the wheel rim. A stationary second sensor for sensing the second poles is provided. The second sensor sends second signals to the computing unit when the second poles pass the second sensor. The computing unit determines the second time period between passing of sequential ones of the second signals, multiplies a reciprocal value of the second time period by a ratio of a memorized angular distance between adjacent ones of the second poles to the 360° circumferential angle of the vehicle wheel to a multiplication product for determining a second rotary frequency, and compares the first rotary frequency with the second rotary frequency.

The second poles preferably cause a change of magnetic flux and the second sensor responds to changes of magnetic flux. Alternatively, the second poles cause a change of optical reflection and/or optical absorption and the second sensor responds to changes of optical reflection and/or optical absorption.

The present invention also relates to a vehicle tire for use with the inventive device, the vehicle tire comprising poles. The poles are preferably arranged within the radially outer area of the vehicle tire. Advantageously, the poles are placed in the vicinity of an axial belt edge to be placed adjacent to a sensor at the vehicle. The axial belt edge has a first and a second belt ply edge zone, wherein belt wires of the first belt ply edge zone project axially outwardly past belt wires of the second belt ply edge zone and wherein the belt wires of the first belt ply edge zones are the poles.

The belt wires of the first belt ply edge zone are preferably uniformly spaced in a circumferencial direction of the vehicle tire.

The major differences of the inventive solution to known rotary frequency measuring devices in slip control systems is that the poles are provided at or within the tire.

A further difference is that the poles within or at the tire can be non-uniformly distributed about the circumference of the tire. In this case, the computing unit must have stored therein the angular distances between neighboring poles or must determine the angular distances by statistical evaluation in order to save them. The computing unit then multiplies the reciprocal value of the respective time period between passing of sequentially arranged poles to the ratio of the respective angle between adjacent poles to the 360° circumferential angle of the tire and supplies this multiplication product as a measure of the rotary frequency to user devices.

The gist of the present invention is thus the arrangement of the poles at the tire preferably radially outwardly such that these poles are practically torsionally stiff relative to the tire tread surface. This allows the measurement of measured values which correlate much better with the main point of interest, i.e., the tire slip. For realizing such a device, tires with poles at their radially outer area, preferably in the vicinity of the axial belt edge, are to be provided.

In a preferred embodiment of the present invention, the poles within the tire are positioned in the vicinity of the belt edge. The arrangement of poles in this area is easily possible and the transmission travel length to a sensor within the wheel well is very short. For realizing such a device, tires are used in which the poles are positioned in the radially outer area of the vehicle tire, preferably in the vicinity of the axial belt edge.

In a preferred embodiment, the poles are designed such that they change the magnetic flux in their vicinity and that the sensor responds to such changes of magnetic flux.

When employing poles that change the magnetic flux, the single pole track at the tire and the time period detection between poles of the same pole track can be easily accomplished in that the axial belt edge has a first and a second belt ply edge zone in which the belt wires (reinforcement elements) form a first edge zone and a second belt ply edge zone wherein the first belt ply edge zone has belt wires that project axially outwardly past the belt wires of the second belt ply edge zone. The belt wires of the first belt ply edge zone provide magnetic flux-changing poles.

Thus, the axial belt ply edge is "frayed" so that, preferably with uniform spacing, individual belt wires or belt cables project farther toward the sensor than the neighboring belt wires or belt cables. The ends of the individual belt wires projecting farther in the direction toward the sensor are the poles. The tire thus does not require any additional components. Such an embodiment is especially useful in connection with non-metallic and thus non-shielding carcasses as they are used in the construction of passenger car and truck tires.

Such a frayed belt edge design is not only without disadvantage for the tire but actually provides an advantage with respect to making the stiffness distribution more uniform and for compensating transverse stress concentrations within the tire. This makes acceptance of the greater technological expenditure for forming such frayed belt edges more acceptable. It is understood that expediently the belt ply of the belt which projects farthest axially outwardly when viewed from the axial center of the tire is to be frayed.

For tires that are to be used unidirectionally, such a belt edge design must only be provided at the side of the tire that will be positioned inwardly relative to the vehicle, where, in general, the sensor will be positioned.

Once sensors will become available which provide for an improved resolution, it is possible to employ the inventive solution in a more effective manner and even cheaper because it would no longer be necessary to provide projecting reinforcement elements (belt wires). Instead, each individual reinforcement element of the axially farthest outwardly positioned belt ply could be detected relative to the interposed rubber material. The time periods for determining the wheel frequency would thus be much shorter, i.e., the measured values would be even more current and furthermore, fraying of the belt edge would not be necessary.

The invention would then be reduced to the novel arrangement of a known sensor of a known ABS system etc., while inventively omitting a magnet wheel etc., within a radially outer portion of the tire such that the radial distance r of the sensor from the rotational axis differs only by at most 10% from the radius R of the axially outer belt edge (viewed from the axial center of the vehicle wheel). It should be positioned axially so closely that the passing of each individual reinforcement element (wire or cable) of this belt ply is detected.

In a further embodiment of the invention, according to the concept of omitting additional components for detecting the rotary frequency of the tire tread surface instead of only of the wheel rim and parts that are connected thereto in a torsionally stiff manner, it is possible to use a sensor which is responsive to changes of the optical reflection and/or optical absorption, whereby the poles positioned at or within the tire produce a change of the optical reflection and/or optical absorption relative to their surroundings and the sensor is responsive to such optical reflection and/or optical absorption changes. This is especially simple when portions of the tire within the detection range of the sensor are not black.

While according to German Patent Application 44 35 160, in deviation from the technology currently used in mass production, time periods between passing of poles of pole tracks positioned at different radii are detected, in the present inventive solution, in the same manner as currently used in mass production, time periods between passing of poles of the same pole track are measured, preferably poles of a single pole track in order to simplify the design. German Patent Application 44 35 160 is primarily designed to measure the torque between the bead area of a tire and the belt ply array (belt), while the present invention is concerned with measuring the rotary frequency of the belt.

In a preferred embodiment of the invention, a second pole track may be provided which is connected in a torsionally stiff manner relative to the wheel rim or the brake drum or brake disk. With this second pole track, the wheel rim rotary frequency can be detected in a manner known per se. The rotary frequency of the wheel rim may deviate from the rotary frequency of the belt, especially after an abrupt change of the torque supplied by the brake (by changing the pressure within the brake line), or changes of the torque supplied onto the tire tread surface (when a different type of road surface is encountered that has a different frictional coefficient), or due to undesirable rotary oscillations between wheel rim and the parts torsionally stiff connected thereto, on the one hand, and the belt and the parts of the tire torsionally stiff connected thereto, on the other hand. The detection and consideration of these differences between the two rotary frequencies allows for a minimization with strong P (proportional) control behavior in comparison to damping control members with D (differential) and I (integral) control behavior. For example, rotary oscillations between wheel rim and belt can be avoided when the control is very fast, i.e., only weakly dampening. This allows for an extremely close approach of the nominal slip value to the critical slip for the respective road surface and thus the greatest possible acceleration.

Despite the similarities of the latter embodiment, which is preferred because it provides the highest possible output, with respect to the number of pole tracks, in comparison to the known solution according to German Patent Application 44 35 160, the major difference to the aforementioned German Patent Application is that the inventive device first measures and evaluates signals of both pole tracks separately in order to determine the actual rotary frequency. Only thereafter, the results of the separate tracks are brought into relation to one another, while according to German Patent Application 44 35 160 the measured values of both pole tracks are paired up for evaluation from the beginning. This difference is very clearly seen when considering the operational reliability:

When only one pole of a device according to German Patent Application 44 35 160 is defective, all measured data are unusable. When one pole of the inventive device is defective, only the measured data of the corresponding pole track are unsuitable for evaluation.

When the pole track radially outwardly at the wheel is defective, the slip control system can still operate as effectively as the current mass-produced systems. When the pole track provided at the wheel rim is defective, the system will still operate and even more effectively than the current prior art systems, because it measures the true rotary frequency, i.e., the rotary frequency of the tire.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 3–6.

Figure 1:
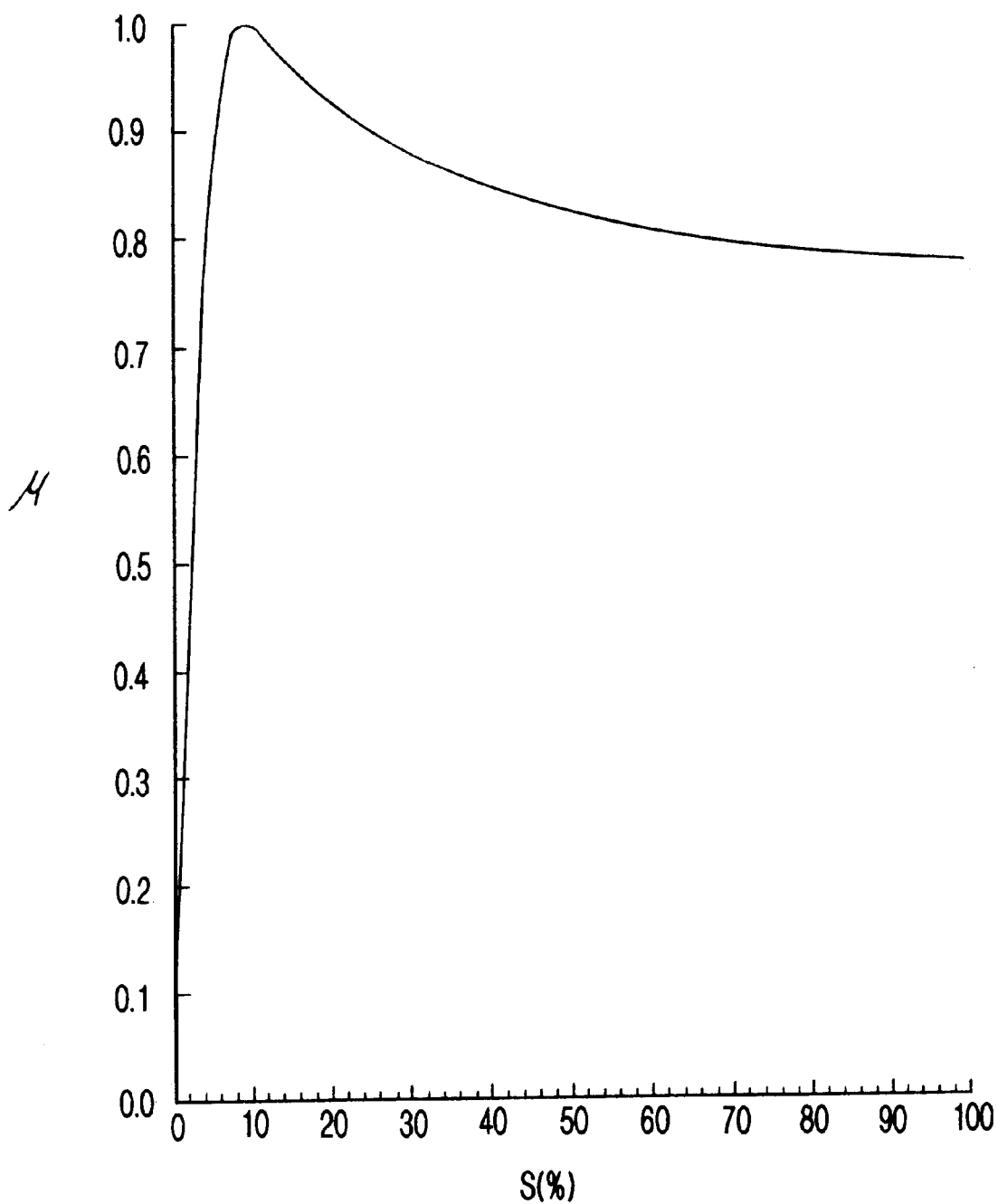
FIG. 1 shows a slip curve for a frictional coefficient as a function of slip.
Figure 2:
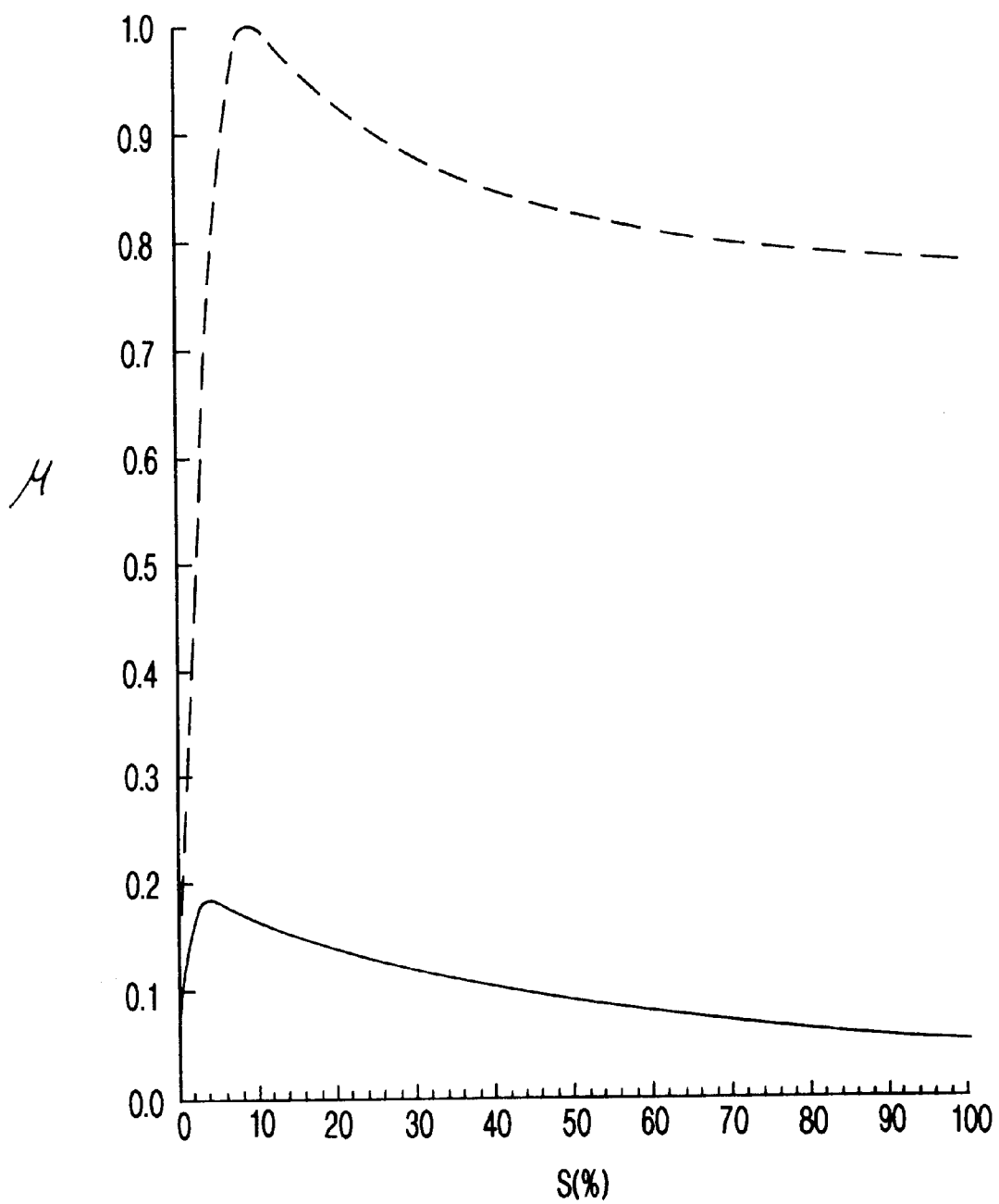
FIG. 2 shows the slip curve of a tire on cold ice.
Figure 3:
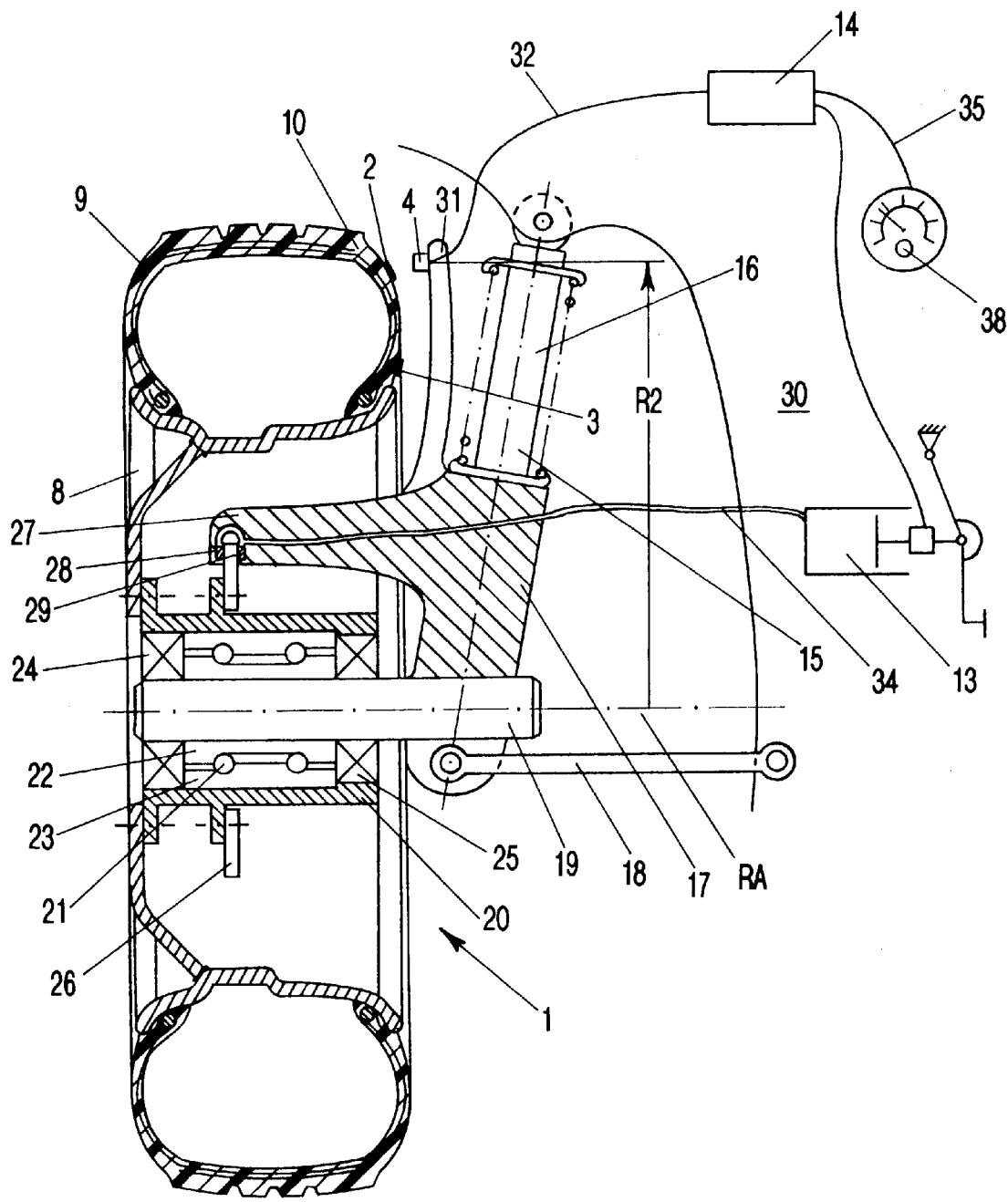
FIG. 3 shows a section of the inventive McPherson wheel suspension with a sensor fixedly connected to the steering knuckle.

FIG. 3 shows a section of the inventive McPherson wheel suspension with the wheel 1 and a strut 15 comprising a piston 16 and a cylinder unit 17. The piston 16 is pivotably connected with its upper end to the car body 30.

The center line of the steering knuckle 19 defines the axis of rotation RA. The inner end of the steering knuckle 19 is fixedly connected to the cylinder unit 17. A first end of a transverse link 18 is connected adjacent to the steering knuckle at the cylinder unit 17 and a second end is pivotably connected to the car body 30. The steering knuckle 19 has a wheel bearing 21 for supporting a wheel hub 20. The wheel bearing 21 is comprised of an inner ring 22 and an outer ring 23 and is sealed to the right and to the left with a respective sealing ring 24, 25.

A wheel rim 8 is mounted onto the wheel hub 20. It supports externally the pneumatic tire 9. Furthermore, a brake disk 26 is mounted on the hub 20. A brake caliper 27 with brake pads 28, 29 engages about the brake disk 26. The brake caliper 27 is fixedly connected to the cylinder unit 17.

At the axially inner side of the pneumatic tire 9 (relative to the vehicle) within the radially outer area of the tire, a track of poles 2 is provided in the vicinity of the axially outer belt edge 10. A sensor support 31 which supports a sensor 4 is fixedly connected to the brake caliper 26 and is thus also fixedly connected to the steering knuckle 19. The sensor 4 detects the passing of the poles 2 of the pole track.

When a pole 2 passes the sensor 4, which is connected by a wire 32 to the computing unit 14, a timer is started which is preferably electronic and quartz-controlled. When the next (second) pole 2 passes the sensor 4, the timer is stopped and the time period between the passing of the two neighboring poles is measured. Preferably, at the same time when the first timer is stopped, the next timer is started and, in the same manner as disclosed, the time period until the subsequent (third) pole 2 passes the sensor 4 is determined. The passing of the next (fourth) pole should then start the first timer and so on.

The results of the computing unit 14 are supplied via wire 35 to the display unit 36. The display unit 36 is preferably arranged within the interior of the vehicle and is comprised of an ABS control lamp 38. Furthermore, the results of the computing unit 14 are supplied to the braking cylinder 13 which supplies the accordingly controlled pressure via brake line 34 to the brake pads 28 and 29 acting on the brake disk 26.

Figure 4:
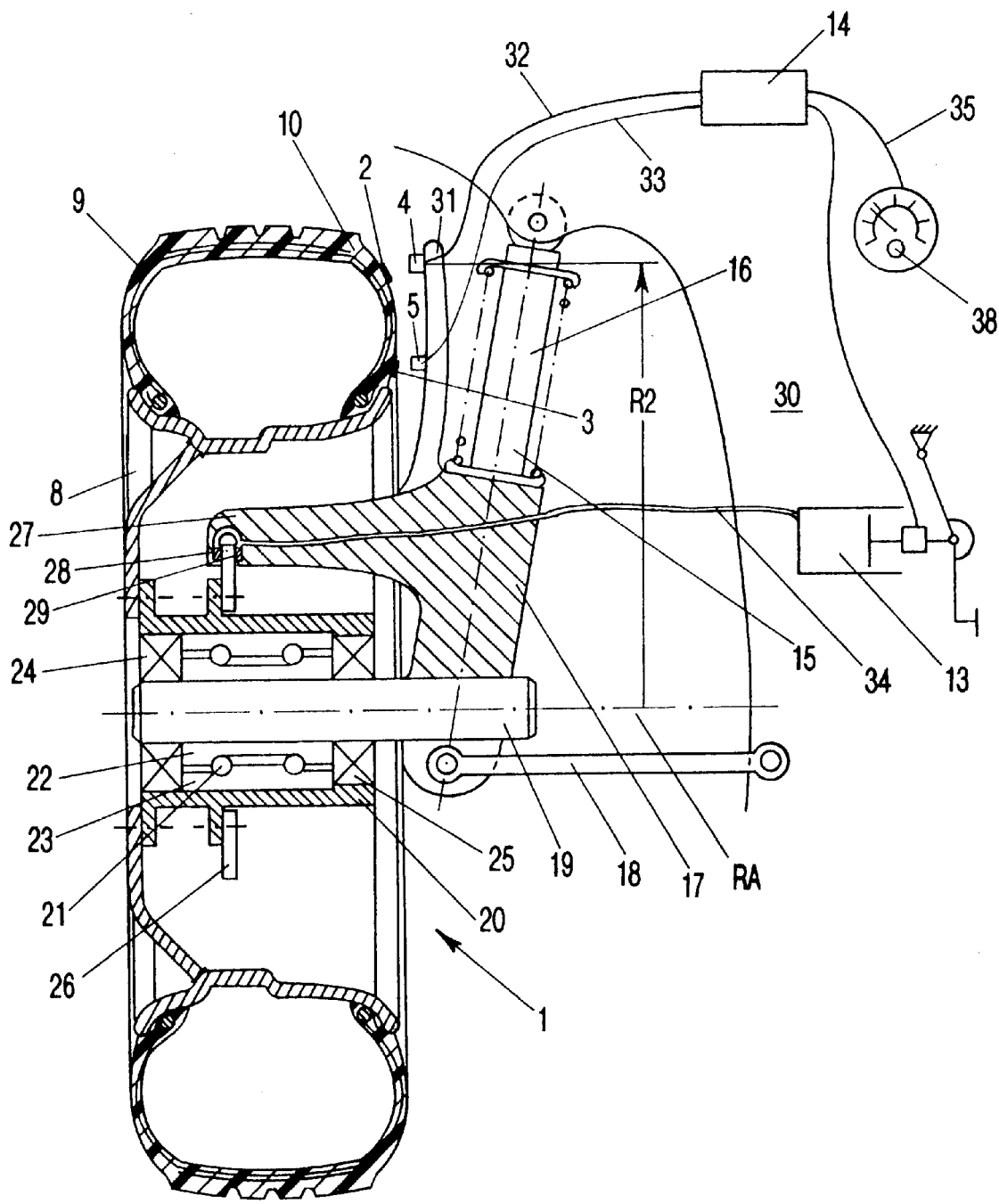
FIG. 4 shows a section of the inventive McPherson wheel suspension similar to FIG. 3, however with two sensors fixedly connected to the steering knuckle.

FIG. 4 is identical to FIG. 3 with the exception of an additional pole track with poles 3 positioned on the bead of the tire in the vicinity of the rim. A further sensor 5 cooperating with the poles 3 and a further line 33 from the sensor 5 to the computing unit 14 are provided. In deviation from the representation of FIG. 4, the poles 3 should preferably be positioned on the brake disk 26. For realizing an optimal data transmission the sensor 5 should be positioned within a depression of the brake caliper 27. The poles 3 could also be arranged at the wheel rim, the sealing rings, brake drum or any other part within the wheel rim area that provides for a torsionally stiff arrangement.

The actually shown arrangement of the poles 3 within the tire bead area, because of the great torsional stiffness in this area (the bead is connected to the wheel rim in a torsionally stiff manner), is only slightly less effective than the aforementioned non-represented arrangement and the results obtained are only slightly less reproducible, but this pole arrangement on the bead has the advantage that the vehicle manufacturer, when ordering brake disks, must not take into consideration the slip control system.

The fast detection of two rotary frequencies thus provides for an even more efficient operation of the brake control system in the range of critical slip because an overcontrol of the control system, which would magnify a torsional oscillation between the tire belt area, on the one hand, and the parts in torsionally stiff connection to the wheel rim, on the other hand, could still be prevented, even for minimal damping action of the control system.

Figure 5:
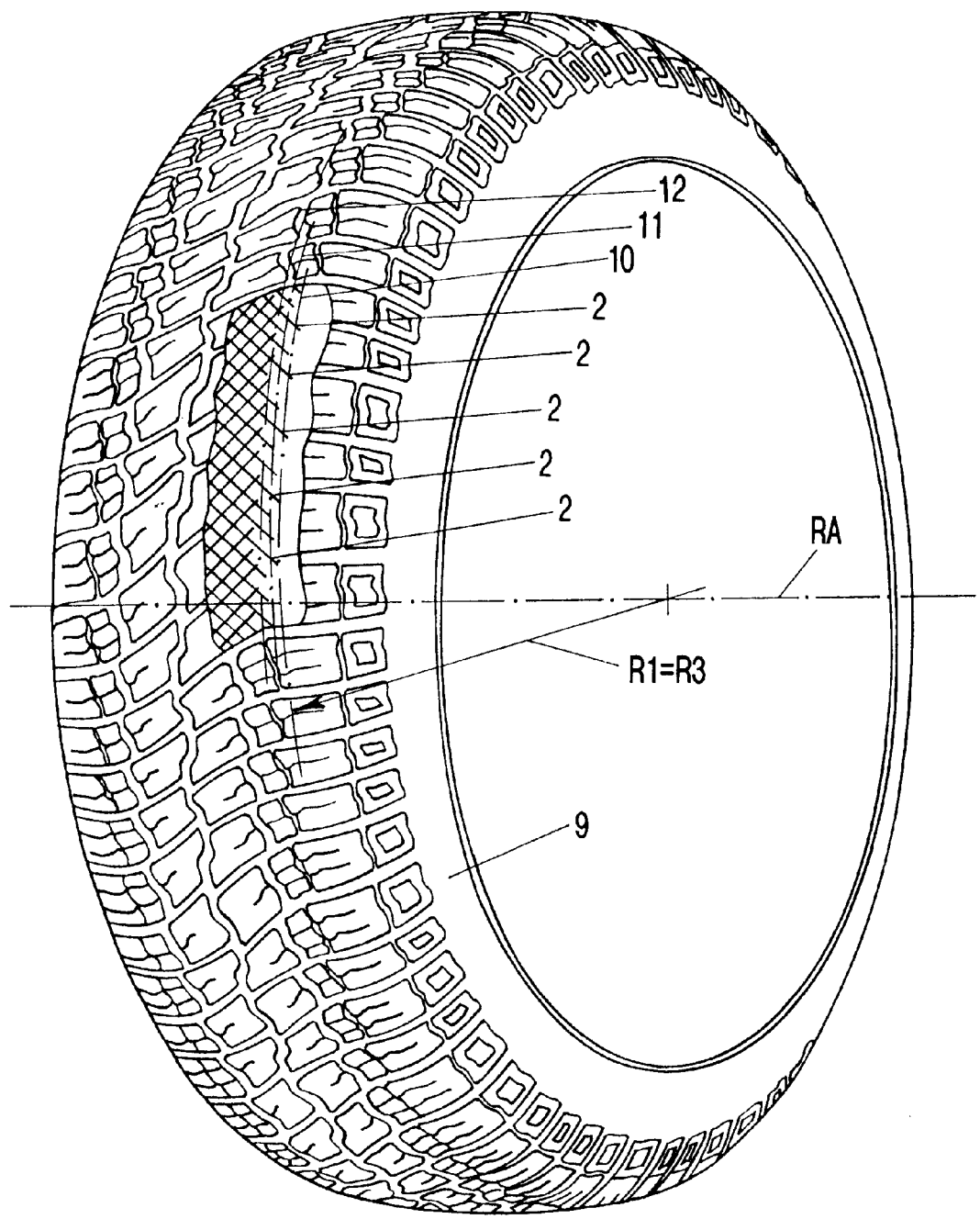
FIG. 5 is a perspective view of an inventive tire with exposed belt edge.

FIG. 5 shows in a perspective view the inventive tire 9 with exposed belt ply edge zones 10 and 11 of the lower belt ply and 12 of the upper belt ply. In the lower belt ply which is somewhat wider than the upper belt ply, every third reinforcement element is extended. Each one of these extensions acts as a pole 2 according to the inventive concept. The extended wires form the belt ply edge zone 10, the shorter ones the belt ply edge zone 11, and the wires that are even shorter than the ones of the belt edge zone 11 belong to the upper belt layer and form the belt ply edge zone 12.

Figure 6:
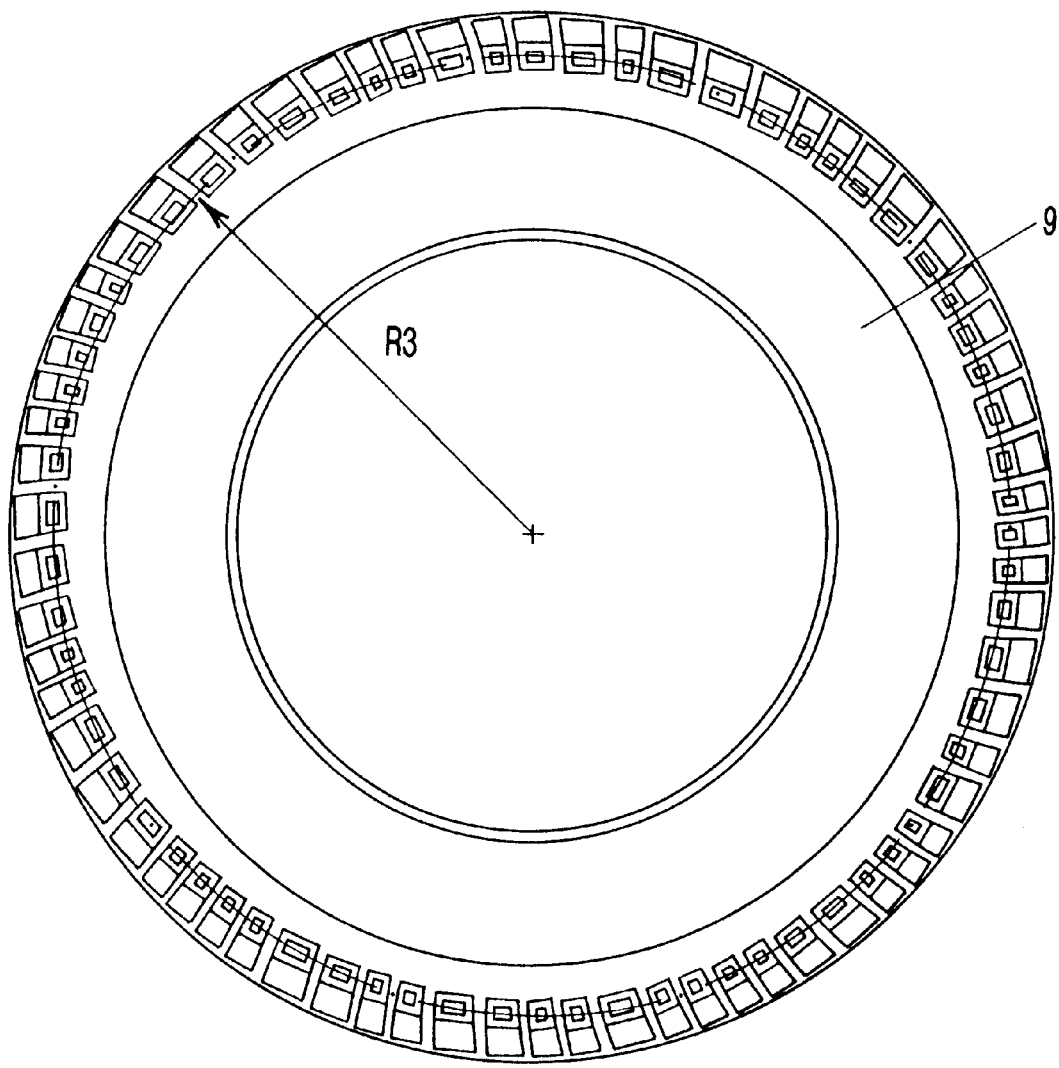
FIG. 6 is a side view of the inventive tire.

FIG. 6 shows in a side view an inventive tire 9. In the area of the radius R2 of the non-represented belt edge discrete positive marks are arranged that have a higher reflective surface. This tire 9 is suitable for cooperation with a light source and a sensor 4, represented in FIGS. 3 and 4, which corresponds to light that is reflected with different strength or with different colors.

The present invention is, of course, in no way restricted to the specific disclosure of the specifications, and drawings, but also encompasses any modifications within the scope of the appended claims.

What we claim is:

1. A device for measuring a rotary frequency of a rotating vehicle wheel, said device comprising:

a number of first poles uniformly arranged on a circle with a radius R1 on or within a vehicle tire;

a first sensor, for sensing said first poles, stationarily arranged at a distance R2 from a rotational axis of the vehicle wheel, wherein 0.9 R1<R2<1.1 R1;

a computing unit connected to said first sensor;

said first sensor sending first signals to said computing unit when said first poles pass said first sensor;

said computing unit determining a first time period between passing of sequential ones of said first poles;

said computing unit multiplying a reciprocal value of said first time period by a reciprocal value of said number of said first poles to a multiplication product and supplying said multiplication product as a measure of a first rotary frequency to a user device.

2. A device according to claim 1, wherein the vehicle tire has an outermost belt edge positioned at a radius R3 relative to said rotational axis RA of the vehicle wheel and wherein 0.9R3<R1<1.1 R3.

3. A device according to claim 2, wherein, in an axial direction of the vehicle tire, said first poles are positioned in the vicinity of said belt edge.

4. A device according to claim 1, wherein said first poles cause a change of magnetic flux and wherein said first sensor responds to changes of magnetic flux.

5. A device according to claim 1, wherein said first poles cause a change of optical reflection or optical absorption and wherein said first sensor responds to changes of optical reflection or optical absorption.

6. A device according to claim 1, wherein said first poles cause a change of optical reflection and optical absorption wherein said first sensor responds to changes of optical reflection and optical absorption.

7. A device according to claim 1, further comprising a number of second poles at the vehicle wheel in non-torsional connection relative to the wheel rim, and a stationary second sensor for sensing said second poles, wherein said second sensor sends second signals to said computing unit when said second poles pass said second sensor, wherein said computing unit determines a second time period between passing of sequential ones of said second poles, multiplies a reciprocal value of said second time period by a reciprocal value of said number of said second poles to a multiplication product for determining a second rotary frequency, and compares said first rotary frequency with said second rotary frequency.

8. A device according to claim 7, wherein said second poles cause a change of magnetic flux and wherein said second sensor responds to changes of magnetic flux.

9. A device according to claim 7, wherein said second poles cause a change of optical reflection or optical absorption and wherein said second sensor responds to changes of optical reflection or optical absorption.

10. A device according to claim 7, wherein said second poles cause a change of optical reflection and optical absorption wherein said second sensor responds to changes of optical reflection and optical absorption.

11. A device for measuring a rotary frequency of a rotating vehicle wheel, said device comprising:

a number of first poles non-uniformly arranged on a circle with a radius R1 on or within a vehicle tire;

a first sensor, for sensing said first poles, stationarily arranged at a distance R2 from a rotational axis of the vehicle wheel, wherein 0.9 R1<R2<1.1 R1;

a computing unit connected to said first sensor;

said first sensor sending first signals to said computing unit when said first poles pass said first sensor;

said computing unit determining a first time period between passing of sequential ones of said first poles;

said computing unit multiplying a reciprocal value of said first time period by a ratio of a memorized angular distance between adjacent ones of said first poles to the 360° circumferential angle of the vehicle wheel to a multiplication product and supplying said multiplication product as a measure of a first rotary frequency to a user device.

12. A device according to claim 11, wherein the vehicle tire has an outermost belt edge positioned at a radius R3 relative to said rotational axis RA of the vehicle wheel and wherein 0.9 R3<R1<1.1 R3.

13. A device according to claim 12, wherein, in an axial direction of the vehicle tire, said first poles are positioned in the vicinity of said belt edge.

14. A device according to claim 11, wherein said first poles cause a change of magnetic flux and wherein said first sensor responds to changes of magnetic flux.

15. A device according to claim 11, wherein said first poles cause a change of optical reflection or optical absorption and wherein said first sensor responds to changes of optical reflection or optical absorption.

16. A device according to claim 11, wherein said first poles cause a change of optical reflection and optical absorption wherein said first sensor responds to changes of optical reflection and optical absorption.

17. A device according to claim 11, further comprising a number of second poles at the vehicle wheel in non-torsional connection relative to the wheel rim, a stationary second sensor for sensing said second poles, wherein said second sensor sends second signals to said computing unit when said second poles pass said second sensor, wherein said computing unit determines a second time period between passing of sequential ones of said second poles, multiplies a reciprocal value of said second time period by a ratio of a memorized angular distance between adjacent ones of said second poles to the 360° angle of revolution to a multiplication product for determining a second rotary frequency, and compares said first rotary frequency with said second rotary frequency.

18. A device according to claim 17, wherein said second poles cause a change of magnetic flux and wherein said second sensor responds to changes of magnetic flux.

19. A device according to claim 17, wherein said second poles cause a change of optical reflection or optical absorption and wherein said second sensor responds to changes of optical reflection or optical absorption.

20. A device according to claim 17, wherein said second poles cause a change of optical reflection and optical absorption wherein said second sensor responds to changes of optical reflection and optical absorption.

* * * * *

UNITED STATES PATENT AND TRADEMARK OFFICE
CERTIFICATE OF CORRECTION

PATENT NO. : 5,926,017
DATED : 07/20/99
INVENTOR(S): Hubertus von Grünberg et al.

It is certified that error appears in the above-identified patent and that said Letters Patent is hereby corrected as shown below:

On the title page, item

[75] Inventors: Hubertus von Grünberg, Thomas Becherer, Heinrich Huinink, Klaus Kleinhoff Signed and Sealed this Fourteenth Day of March, 2000

*Attest:*

Q. TODD DICKINSON

*Attesting Officer*   *Commissioner of Patents and Trademarks*